Sept. 6, 1960  J. E. CALDWELL  2,951,284
CLARINET TENON REPAIR TOOL AND METHOD OF REPAIRING CLARINETS
Filed Dec. 12, 1958  3 Sheets-Sheet 2
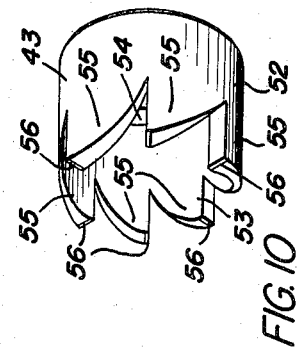
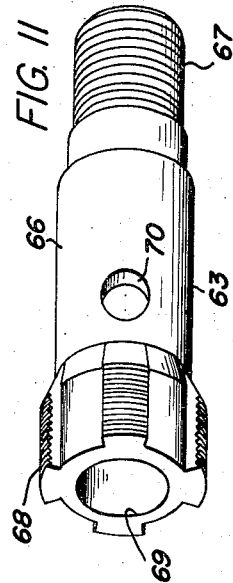
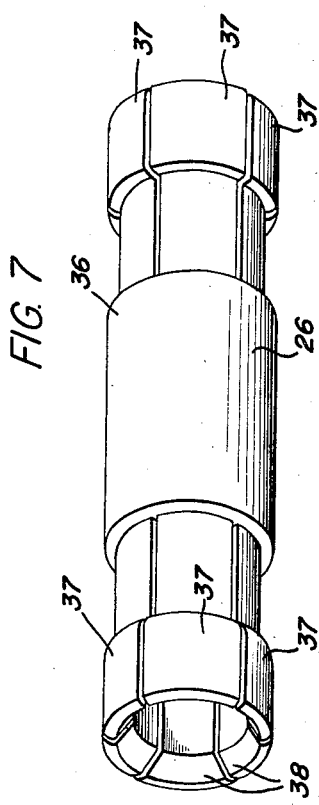
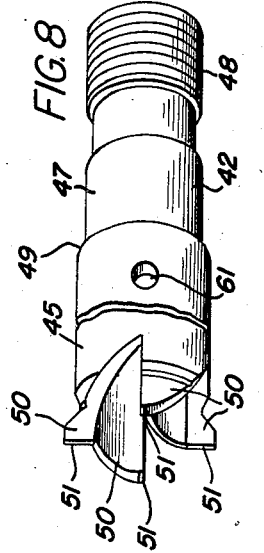
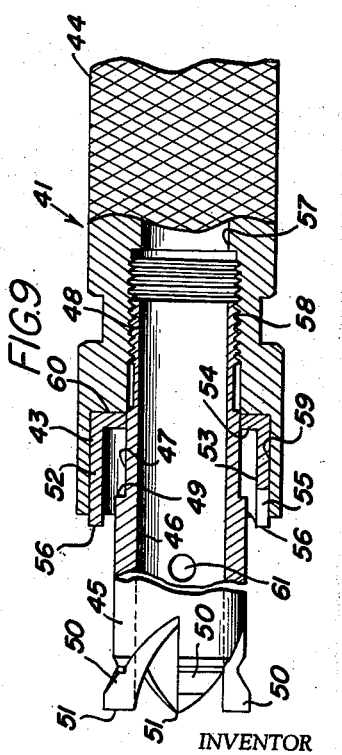
INVENTOR
JAMES E. CALDWELL
BY Kimmel & Crowell
ATTORNEYS Sept. 6, 1960
J. E. CALDWELL
2,951,284
CLARINET TENON REPAIR TOOL AND METHOD OF REPAIRING CLARINETS
Filed Dec. 12, 1958
3 Sheets-Sheet 3
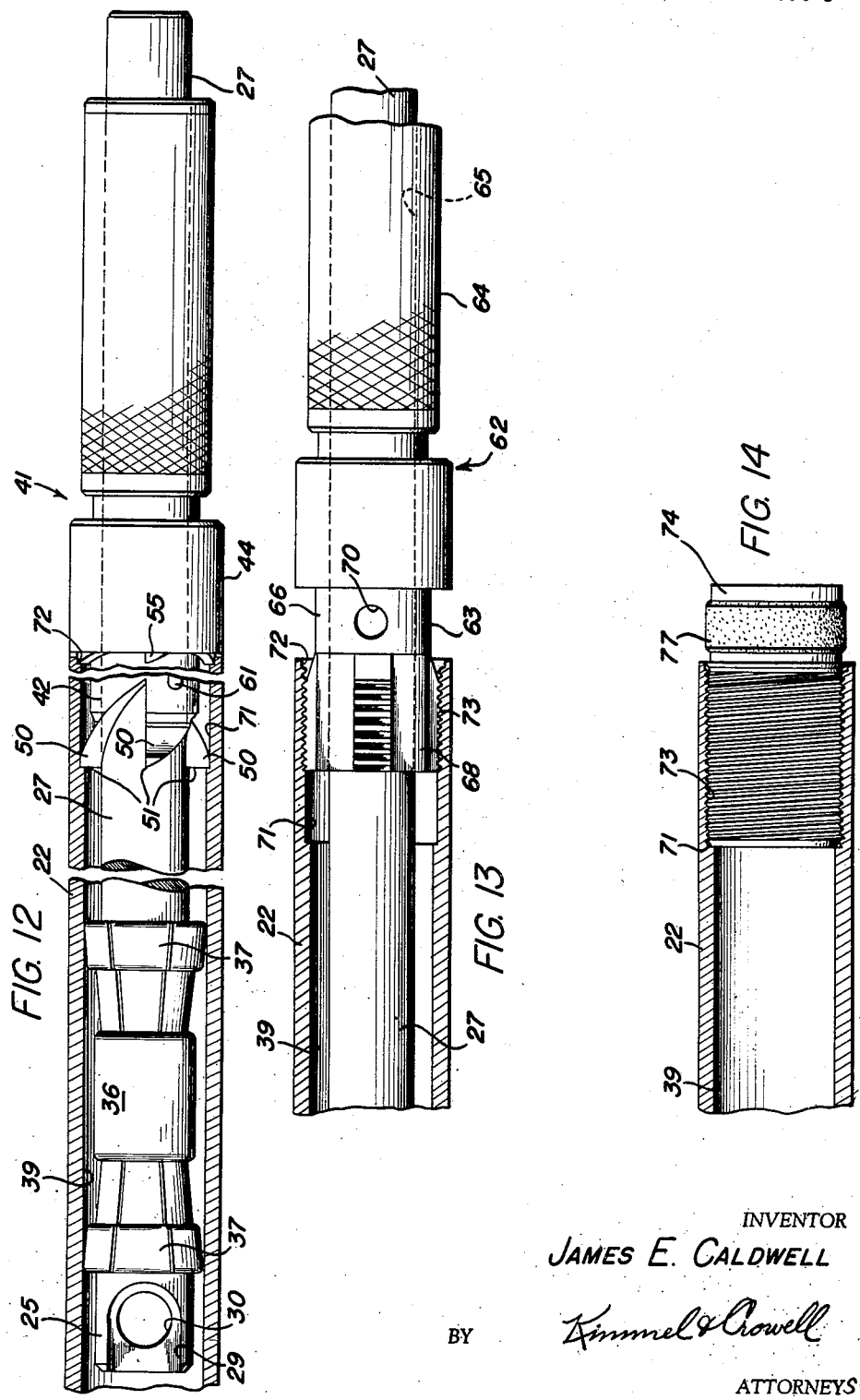
INVENTOR
JAMES E. CALDWELL
BY Kimmel & Crowell
ATTORNEYS

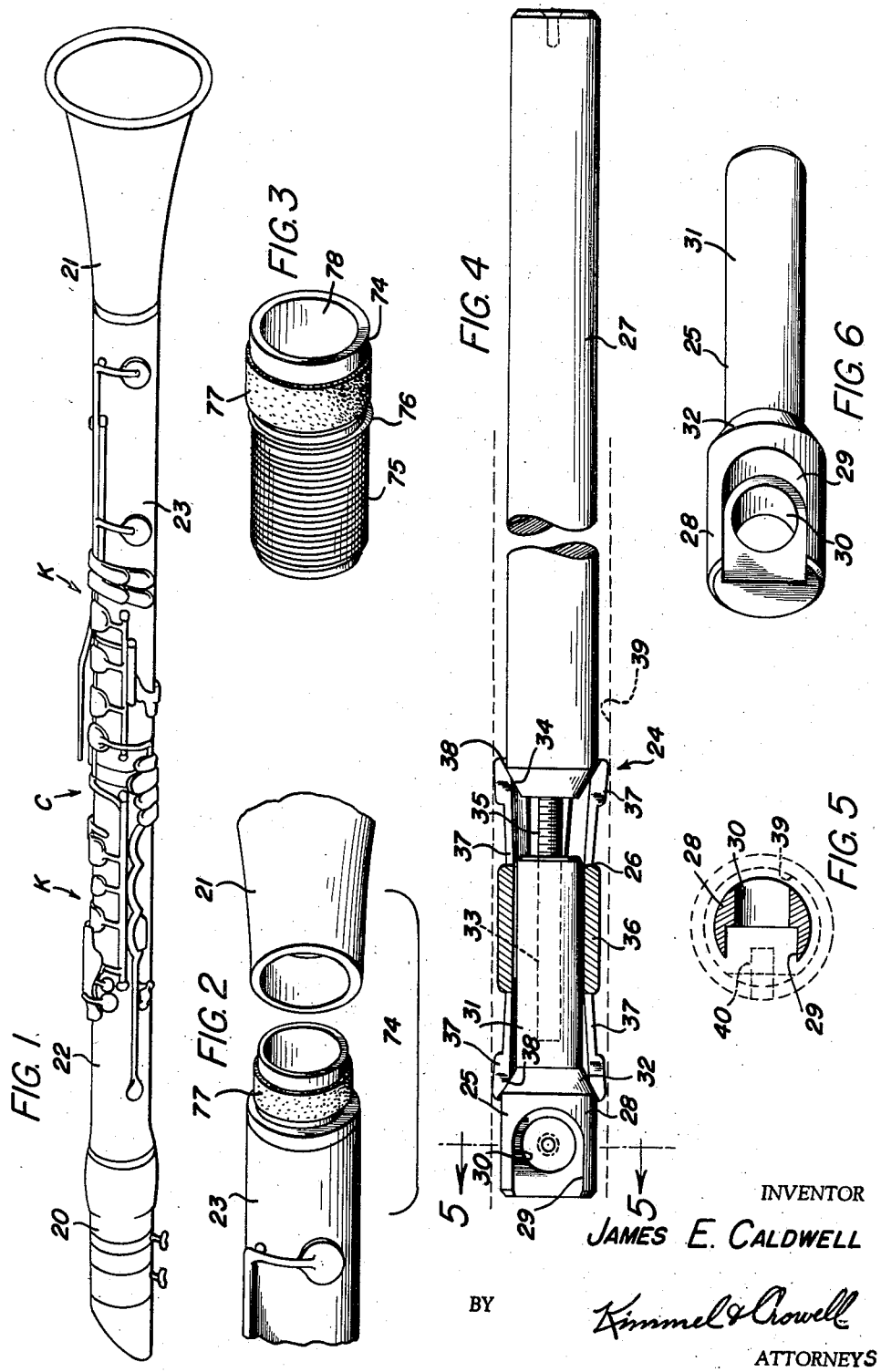

United States Patent Office 2,951,284
Patented Sept. 6, 1960

2,951,284
CLARINET TENON REPAIR TOOL AND METHOD OF REPAIRING CLARINETS
James E. Caldwell, 221 Grape St., Abilene, Tex.
Filed Dec. 12, 1958, Ser. No. 779,933
2 Claims. (Cl. 29—401)

The present invention relates to a clarinet tenon repair tool and the method of repairing clarinets, particularly wherein a broken tenon is replaced without requiring the disassembly of the keys of the clarinet.

The primary object of the invention is to provide a clarinet repair tool and method of repairing a clarinet wherein the bore of the clarinet is utilized for centering the tool and the repair can be effected without the necessity of mounting the clarinet in a lathe.

Another object of the invention is to provide a clarinet repair tool and method of repairing clarinets in which a pilot bar is clamped in the bore of the clarinet in axially aligned relation thereto to provide a guide for cutting and threading members journalled thereon.

A further object of the invention is to provide a method of repairing clarinets in which a broken tenon is removed and the clarinet is recessed and internally threaded to receive a threaded tenon which is threaded therein.

Other objects and advantages will become apparent in the following specification when considered in light of the attached drawings, in which:

Figure 1 is a perspective view of a clarinet in assembled condition of the type to be repaired by the tool and method of the invention;

Figure 2 is an exploded perspective of one tenon joint of the clarinet following its repair;

Figure 3 is a perspective view of the repair tenon prior to its mounting in the clarinet;

Figure 4 is a side elevation shown partially broken away and in section of the pilot bar assembly with the bore of the clarinet shown in broken lines;

Figure 5 is a transverse sectional view taken along the line 5—5 of Figure 4, looking in the direction of the arrows, with the clarinet shown in broken lines;

Figure 6 is a perspective view of the head piece forming part of the pilot bar assembly;

Figure 7 is a perspective view of the expanding collet forming part of the pilot bar assembly;

Figure 8 is a perspective view of the recessing cutter;

Figure 9 is a fragmentary side elevation of the cutting tool assembly shown partially broken away and in section for convenience of illustration;

Figure 10 is a perspective view of the flushing cutter forming part of the cutting tool assembly.

Figure 11 is a perspective view of the threading tap;

Figure 12 is a fragmentary side elevation of the cutting tool assembly in cutting position on the pilot bar assembly, with the clarinet shown in longitudinal section;

Figure 13 is a fragmentary side elevation of the threading tool assembly in threading position on the pilot bar assembly, with the clarinet shown in longitudinal section; and Figure 14 is a fragmentary longitudinal sectional view illustrating the repair tenon attached to the clarinet.

Referring now to the drawings in detail wherein like reference characters indicate like parts throughout the several figures, the reference numeral C indicates generally a clarinet which includes a mouth piece 20 at one end and a flared bell 21 at the opposite end. A pair of intermediate sections 22, 23 extend in axial alignment to connect the mouth piece 20 and the bell section 21.

The sections 22, 23 and the bell section 21 are normally connected by integral reduced diameter tenons (not shown) which are inserted into the next section with a friction fit. In assembling and disassembling the clarinet C, the integral tenons often times become broken, requiring rather expensive repairs to permit the clarinet to again be played.

In the present methods of repairing broken tenons in clarinets, the keys K are first completely disassembled from the section having the broken tenon and the section is mounted in a lathe. The unbroken portions of the tenon are then cut away by conventional lathe tools and a recess is cut concentric with the bore of the section. The recess is then threaded with conventional threading dies and a blank threaded repair tenon is threaded into the section. The blank threaded repair tenon is then further machined in the lathe so that its bore is uniform with the bore of the section and to provide grooves to receive the cork seals normally mounted on the tenon. Following this operation, the keys are reassembled on the section and the clarinet C can be assembled and played as desired.

To repair tenons in clarinets by this method requires a highly skilled craftsman who must be provided with an expensive lathe. Due to the fact that the keys must be assembled and disassembled, as well as the fact that finish machining is required on the repair tenon, the presently practised repair methods require a considerable amount of time and are quite expensive.

With the present invention, there is no necessity to remove the keys on the clarinet and the operation can be conducted by hand without the need of an expensive lathe. With this method, applicant uses a fully premachined repair tenon and the total repair time is reduced about 80%.

Referring now to the specific tools utilized in the repairing of clarinets, refer first to Figures 4 through 7 wherein a pilot bar assembly is indicated generally at 24 and includes a head piece 25, expanding collet 26 and a pilot bar 27. The head piece 25 has a generally cylindrical end portion 28 having an elongated longitudinally extending slot 29 milled therein. A bore 30 extends through the cylindrical end portion 28 extending from the base of the slot 29. A reduced diameter cylindrical portion 31 is connected to the cylindrical portion 28 in axial alignment therewith by a taper section 32. The cylindrical portion 31 is provided with an axial threaded bore 33, as best seen in Figure 4.

The pilot bar 27 is of elongated cylindrical form and is provided with a taper section 34 on one end thereof. A threaded reduced diameter extension 35 extends axially of the pilot bar 27 from the end thereof carrying the taper section 34. The threaded reduced diameter portion 35 is arranged to be threaded into the threaded bore 33, as shown in Figure 4.

The expanding collet 26 includes a tubular cylindrical central section 36 which is mounted on the cylindrical portion 31 of the head piece 25. A plurality of radially arranged spring jaws 37 are connected to each end of the tubular section 36. The jaws 37 have an internal outwardly flaring face 38 arranged to engage the taper sections 32, 34 of the head piece 25 and the pilot bar 27. The expanding spring jaws 37 are moved radially outwardly by threading the extension 35 into the threaded bore 33 to draw the taper sections 32, 34 closer together in a camming action against the faces 38 of the jaws 37. As can be seen in Figure 4, the jaws 37 are brought into contact with the inner surface of the bore 39 of clarinet C. The slot 29 in the cylindrical portion 28 of the head piece 25 is arranged to straddle the thumb tone-hole tube 40 so as to restrain the head piece 25 against rotation in the bore 39 as the jaws 37 are expanded into contact therewith. The bore 30 in some clarinets may be aligned with an existing bore in the clarinet and a pin (not shown) can be extended through the bore to engage in the bore 30 to also lock the head piece 25 against rotation with respect to the clarinet. The concentric arrangement of the jaws 37, taper sections 32, 34 and the cylindrical portion 31 of the head piece 25 provides a concentric mounting for the pilot bar 27 so that the pilot bar 27 is in perfect axial alignment with the bore 39 of the clarinet. The pilot bar 27 projects beyond the broken tenon out of the clarinet to provide a support for tool described below.

After the pilot bar assembly 24 is mounted in a clarinet C, a cutter tool assembly, generally indicated at 41, is engaged over the pilot bar 27 to perform the cutting operation. The cutting tool assembly 41 includes a recessing cutter 42, a flushing cutter 43 and a handle 44. The recessing cutter 42 has a generally cylindrical body 45 with a central bore 46 having a diameter to engage over the pilot bar 27 with no play therebetween. A reduced diameter cylindrical extension 47 extends integrally from the cylindrical body 45 and has the opposite end thereof provided with external threads 48. The reduced diameter cylindrical extension 47 forms with the body 45 an annular shoulder 49. A plurality of teeth 50 are formed in the end of the body 45 oppositely of the threads 48. The teeth 50 have cutting edges 51 formed thereon, as best seen in Figures 8 and 9. The cutting edges 51 on the teeth 50 are arranged in a circle concentric with the cylindrical body 45 having a diameter slightly greater than the body 45, as can be clearly seen in Figure 9.

The flushing cutter 43 has a generally cylindrical body 52 having a bore 53 extending therethrough. A radially inwardly extending annular flange 54 is integrally formed on one end of the body 52 and a plurality of teeth 55 are integrally formed on the opposite end of the body 52 and provided with cutting edges 56.

The annular flange 54 is slidably mounted on the reduced diameter portion 47 of the recessing cutter 42 and is adapted to engage the shoulder 49 with the cylindrical body 52 concentric with the cylindrical body 45.

The handle 44 has an axial bore 57 extending therethrough provided with internal threads 58 adjacent one end thereof.

The handle 44 has an enlarged bore 59 extending outwardly from the bore 57 adjacent the threads 58. The juncture between the enlarged bore 59 and the bore 57 forms an internal radially extending annular shoulder 60, as can be clearly seen in Figure 9. The flushing cutter 43 is mounted in the enlarged bore 59 with the flange 54 engaging against the shoulder 60. The recessing cutter 42 has its threads 48 engaged in the threads 58, securing it to the handle 44 with the shoulder 49 engaging against the side of the flange 54 opposite the shoulder 60. The recessing cutter 42 clamps the flushing cutter 43 tightly to the handle 44. A bore 61 extends through the body 45 to permit a drive handle (not shown) to be inserted therethrough for rotating the recessing cutter 42 when attaching it to the handle 44. The cutting edges 56 of the flushing cutter 43 extend slightly beyond the end of the handle 44 to undercut the end of the clarinet section 22 for reasons to be assigned. The handle 44 is arranged to engage the end of the clarinet section 22 limiting the extent of the undercutting accomplished by the teeth 55.

A threading tool assembly 62 is illustrated in Figure 13 and includes a threading tap 63 and a handle 64. The handle 64 is constructed along the same general lines as the handle 44 and is provided with an axial bore 65 for engagement over the pilot bar 27. In Figure 11 the threading tap 63 is illustrated with a central cylindrical body 66 which has a reduced diameter threaded extension 67 on one end and an enlarged threading tap portion 68 on the other end. A bore 69 extends axially through the cylindrical body 66, the threading tap portion 68 and the threaded extension 67 to engage over the pilot bar 27 to maintain the threading tool assembly 62 in aligned relation to the clarinet section 22. The threading tap 63 is secured to the handle 64 by means of the threads 67 and is provided with a transversely extending bore 70 to receive a drive handle used for tightening the threading tap 63 in the handle 64.

The recessing cutter 42 when rotated by the handle 44 on the pilot bar 27 cuts an enlarged diameter bore 71 into the section 22 to the desired depth. The flushing cutter 43 cuts a shallow annular recess 72 in the outer end of the enlarged bore 71, as can be best seen in Figure 12. The cutting tool assembly 41 is then removed and the threading tool assembly 62 is mounted on the pilot bar 27 and the threading tap portions 68 thereof cut threads 73 in the enlarged diameter bore 71 of the clarinet section 22. After the clarinet section 22 has been recessed and threaded, a repair tenon 74 having threads 75 thereon is threaded into the clarinet C until an annular flange 76 thereon engages in the shallow recess 72. The threaded repair tenon 74 is provided with a normal cork gasket 77 which frictionally fits the companion section of the clarinet C in the identical manner as the broken tenon prior to its being broken. The repair tenon 74 has a bore 78 therein of a diameter to properly fit the clarinet C.

After the repair tenon 74 has been inserted in the clarinet C the clarinet C may be assembled and disassembled in the normal manner when preparing to play or to store the instrument.

In applicant's method of repairing clarinets having broken tenons thereon, a pilot bar is clamped to the bore of the clarinet in axial alignment therewith to guide a combined recessing and flushing cutter while cutting an enlarged bore and an annular recess in its outer end in the broken end of the clarinet. The pilot bar then serves as a guide for a threading cutter while the enlarged bore is threaded. The pilot bar is then removed from the clarinet section and a threaded repair tenon is threaded into the threaded enlarged bore to replace the broken tenon.

Having thus described the preferred embodiment of the invention, it should be understood that numerous structural modifications and adaptations may be resorted to without departing from the scope of the appended claims.

What is claimed is:

1. The method of repairing a clarinet having a broken tenon which comprises the steps of clamping a pilot bar into the bore of the clarinet in axial relation thereto, guiding a recessing cutter on said pilot bar and cutting an enlarged bore into the end of the bore of the clarinet, removing said recessing cutter, guiding a threaded tap on said pilot bar while threading said enlarged bore, removing the pilot bar and threaded tap, and inserting a threaded repair tenon in the threaded enlarged bore.

2. A tool for the repairing of clarinets comprising a pilot bar, a tapered end on said bar, a threaded extension on said tapered end, a head piece, a cylindrical extension on said head piece, a threaded bore in said cylindrical extension into which said threaded extension seats, an expanding collet surrounding said cylindrical portion, said collet including a tubular cylindrical central section, and a plurality of radially arranged spring jaws connected at either end of said central section, a tapered end section on said head piece at its juncture with said cylindrical portion, whereby rotation of said pilot bar occasions rotation of said threaded extension in said threaded bore to draw said tapered sections toward each other to expand the opposite ends of said spring collet clampingly to engage said tool in the bore of the clarinet, and means associated with said head section for securing an operating tool thereto.

References Cited in the file of this patent

UNITED STATES PATENTS

| | | |
|---|---|---|
| 1,350,901 | Volkenburg | Aug. 24, 1920 |
| 2,177,214 | Heldenbrand | Oct. 24, 1939 |
| 2,348,186 | Bashore | May 9, 1944 |
| 2,573,790 | Herzog | Nov. 6, 1951 |